(12) United States Patent  
Nobori

(10) Patent No.: US 8,559,529 B2
(45) Date of Patent: Oct. 15, 2013

(54) DISPLAY SYSTEM, IMAGE OUTPUT DEVICE AND IMAGE DISPLAY DEVICE

(75) Inventor: Tatsuhiko Nobori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1048 days.

(21) Appl. No.: 12/572,719

(22) Filed: Oct. 2, 2009

(65) Prior Publication Data

US 2010/0110285 A1    May 6, 2010

(30) Foreign Application Priority Data

Nov. 4, 2008   (JP) ................................ 2008-283442

(51) Int. Cl.
*H04N 7/12*   (2006.01)
*G06K 9/36*   (2006.01)

(52) U.S. Cl.
USPC ....................... 375/240.29; 382/266; 382/232

(58) Field of Classification Search
CPC ............................. H04N 7/2688; H04N 7/50
USPC ................. 375/240.01–240.29; 382/232, 239
See application file for complete search history.

(56) References Cited

U.S. PATENT DOCUMENTS

| 5,872,864 | A | 2/1999 | Imade et al. |
| 6,961,460 | B2 | 11/2005 | Nagai et al. |
| 7,085,379 | B1 | 8/2006 | Kagechi et al. |
| 7,801,382 | B2 * | 9/2010 | Hernandez et al. ........... 382/239 |
| 8,023,749 | B2 * | 9/2011 | Nakayama .................... 382/232 |
| RE42,978 | E * | 11/2011 | Haneda ..................... 375/240.26 |
| 2006/0126954 | A1 | 6/2006 | Kim |
| 2009/0023482 | A1 | 1/2009 | Koura et al. |
| 2009/0136125 | A1 | 5/2009 | Fujita |

FOREIGN PATENT DOCUMENTS

| CN | 1 448 892 A | 10/2003 |
| CN | 101075348 A | 11/2007 |
| JP | A-2001-157226 | 6/2001 |
| JP | A-2001-218065 | 8/2001 |
| JP | A-2002-247373 | 8/2002 |
| JP | A-2004-193818 | 7/2004 |
| JP | A-2006-166403 | 6/2006 |
| JP | A-2006-287898 | 10/2006 |
| JP | A-2007-259372 | 10/2007 |
| WO | WO 2007/000999 A1 | 1/2007 |

* cited by examiner

*Primary Examiner* — Gims Philippe
(74) *Attorney, Agent, or Firm* — Oliff & Berridge, PLC

(57) ABSTRACT

A display system includes: an image data output device which outputs image data; an image display device which displays an image corresponding to the image data; and a control device which controls the image data output device; wherein one of the control device and the image data output device has a compression rate setting unit which determines whether the image corresponding to the image data is a natural image or not and sets a compression rate for the image in accordance with a type of the image; and the image data output device has an image data output unit which outputs a compressed image data acquired by compressing the image data at the compression rate set by the compression rate setting unit.

10 Claims, 7 Drawing Sheets

DISPLAY SYSTEM, IMAGE OUTPUT DEVICE AND IMAGE DISPLAY DEVICE

The entire disclosure of Japanese Patent No. 2008-283442 filed Nov. 4, 2008 is expressly incorporated by reference herein.

BACKGROUND

1. Technical Field

The present invention relates to a display system, and an image output device and an image display device that are used in the display system.

2. Related Art

Traditionally, an image display device such as a projector which forms and displays an image corresponding to inputted image information is known. In many cases, such an image display device is connected to an image output device such as a PC (personal computer) and thus used as a display system.

Images outputted from the image output device and displayed by the image display device are roughly divided into natural images and non-natural images. Of these, natural images are images of landscapes and so on and are often dynamic images, for example, as shown in movies. Meanwhile, non-natural images are images of letters, graphic patterns and so on and are often still images, for example as shown in graphs and tables used for presentations. Even if such natural images are compressed to a certain degree, deterioration of the images due to compression is not conspicuous. However, deterioration of non-natural images tends to be conspicuous since these images have many areas containing straight lines.

Thus, a digital camera is known which switches compression systems for an image to be saved between pickup of a natural image and pickup of a non-natural image (see, for example, JP-A-2001-218065). Also, a calligraphic and painting works photographing device is known which compares a picked-up image with a immediately previous picked-up image that is acquired, and then picks up the image with high resolution if there is no change between the images and the picked-up image is different from a reference image, or picks up the image with low resolution if there is a change between the images and the picked-up image is the same as the reference image (see, for example, JP-A-2007-259372).

However, the digital camera described in JP-A-2001-218065 has a problem that the user needs to switch modes between pickup of a natural image and pickup of a non-natural image.

The calligraphic and painting works photographing device described in JP-A-2007-259372 compares a picked-up image with a immediately previous picked-up image. Therefore, the device has a problem that a storage unit to save the immediately previous picked-up image that is immediately before (an image of at least one frame) is needed for the comparison between the images and this makes the device expensive.

SUMMARY

An advantage of some aspects of the invention is that a display system, an image output device and an image display device can be provided that can be configured inexpensively and can output images corresponding to image types.

According to an aspect of the invention, there is provided a display system including an image data output device which outputs image data, an image display device which displays the image corresponding to the image data, and a control device which controls the image data output device. One of the control device and the image data output device has a compression rate setting unit which determines whether the image corresponding to the image data is a natural image or not and sets a compression rate for the image data in accordance with a type of the image. The image data output device has an image data output unit which outputs a compressed image data acquired by compressing the image data at the compression rate set by the compression rate setting unit.

Here, a natural image refers to an image having a small change in luminance between neighboring pixels, for example, in a landscape image, as described above. This natural image may include an image generated by CG (computer graphics) as long as the image has a small change in luminance. A non-natural image refers to an image having a large change in luminance between neighboring pixels, for example, in a graph or table.

The control device may be included in the image data output device or may be included in the image display device. Alternatively, the control device may be a stand-alone device that is independent of the image data output device and the image display device.

According to this aspect of the invention, it is determined whether the image corresponding to the image data is a natural image or not, and a compression rate is set in accordance with the type of the image. The image data output unit outputs a compressed image data acquired by compressing the image data at the set compression rate, to the image display device.

Accordingly, since the compressed image data compressed in accordance with the type of the image is outputted, the user does not need to switch modes between when outputting a natural image and when outputting a non-natural image. Moreover, since it is not necessary to compare an image to be outputted with an image to be outputted immediately before the former image, the storage capacity of the image data output device can be reduced. Therefore, a display system that can adjust the data volume (data size) of an image data outputted to the image display device in accordance with the type of the image can be configured inexpensively as a whole, and image data output corresponding to the image type can be carried out.

An image pickup device may be included in the image data output device or may be provided as a stand-alone device that is independent of the image data output device, the image display device and the control device. If the image pickup device is independent of the image data output device, the image data output device may be configured to acquire a picked-up image data from the image pickup device.

The data volume of the picked-up image data to be outputted to the image display device can be adjusted in accordance with the type of the image (picked-up image) picked up by the image pickup device. Therefore, in the case of displaying the picked-up image in real time, the picked-up image with its data volume adjusted can be displayed while deterioration in image quality can be made inconspicuous.

That is, a natural image has relatively few areas containing straight lines and has a relatively unnoticeable edge. Therefore, if a compressed image data with a high compression rate is generated from the natural image, deterioration in image quality tends to be unnoticeable and the data volume of the compressed image can be substantially reduced. On the other hand, a non-natural image has a noticeable edge. Therefore, if a compressed image data with a low compression rate is generated from the non-natural image, a sharp non-natural image can be displayed without omitting the edge though the data volume reduction rate is lower than that of the compressed image based on the natural image. Therefore, according to the type of the image, deterioration in image quality can be mode inconspicuous and the data volume of images can be reduced.

It is preferable that one of the control device and the image data output device further includes an extraction unit which extracts an edge component of the image data, and that the extraction unit has a numeric representation unit which performs predetermined filtering of a luminance component of each pixel constituting the image data and provides a numeric representation of the edge component of the image data.

For example, as the numeric representation unit performs proper filtering of the luminance component of each pixel, the edge component of the image data can be easily numerically represented. Such filtering includes Sobel filter processing, Roberts filter processing, and Laplacian filter processing in four directions or eight directions. As the compression rate setting unit compares the luminance value of the entire image based on the numerically represented edge component with a predetermined threshold value (luminance value), it can be easily determined whether the image corresponding to the image data is a natural image or not. Thus, the image type can be easily determined. The extraction of the edge component by the extraction unit may be carried out as real-time processing which is carried out every time a picked-up image data is acquired by the image pickup device. Alternatively, if a storage unit is provided, the extraction may be carried out after image pickup by the image pickup device is completed.

In filtering by an edge highlighting unit, for example, an edge component having a highlighted vertical line and horizontal line of the image may be extracted, and the edge component may be further highlighted in binarization by a binarizing unit. Thus, the image type can be determined more properly on the basis of the highlighted edge component. Therefore, a more appropriate compression rate of the image data can be set. Here, a vertical line is a line parallel to the vertical direction of the image represented by image data, and a horizontal line is a line orthogonal to the vertical line.

Now, the connection format for connecting the image display device and the image data output device (for example, wired or wireless LAN (local area network) connection, or USB (universal serial bus) connection) has a preset bandwidth. To properly display an image outputted from the image data output device at the image display device, the bandwidth needs to be effectively used.

Therefore, a rate setting unit sets a predetermined frame rate, for example, as a frame rate in the case where the image data outputted by the image data output device is determined as being a natural image and a compressed image data with a reduced size acquired by compressing the image data at a high compression rate is outputted. The rate setting unit sets a lower frame rate than the predetermined frame rate as a frame rate in the case where the image corresponding to the image data is determined as being a non-natural image and a compressed image data having an increased size acquired by compressing the image data at a low compression rate is outputted. Thus, a compressed non-natural image data with a large data size can be outputted at a low frame rate and a compressed natural image data with a small data size can be outputted at a high frame rate. Therefore, the bandwidth of the connection format for connecting the image output device and the image display device can be effectively used, and natural images such as dynamic images kind of movies and non-natural images such as still images can be properly displayed.

According to another aspect of the invention, there is provided an image data output device capable of achieving the same advantage as that of the display system.

That is, image type is determined on the basis of a picked-up image acquired by an image pickup unit. A compressed image data compressed at a compression rate set in accordance with the image type, that is, a compressed image data of the picked-up image, is outputted. Thus, an image display device can properly display an image with its data size reduced in accordance with image type. As such an image data output device is used, a display system that can carry out image data output corresponding to image type can be inexpensively configured without requiring a user's selection operation and a storage unit for comparing picked-up images.

According to still another aspect of the invention, there is provided an image data transmission method for transmitting image data from an image data output device to an image display device including, at the image data output device, (a) determining whether the image corresponding to the image data is a natural image or not and setting a compression rate for the image, (b) compressing the image data at the set compression rate, and (c) outputting the compressed image data compressed at the compression rate to the image display device as the image data.

The image data transmission method can achieve the same advantage as that of the image display system. For example, the image data output device determines the image type and outputs a compressed image data compressed at a compression rate set in accordance with the image type, that is, a compressed image data of a picked-up image. Therefore, the image display device can properly display an image with its data size reduced in accordance with the image type.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Hereinafter, a first embodiment of the invention will be described with reference to the drawings.

Configuration of Display System

Figure 1:
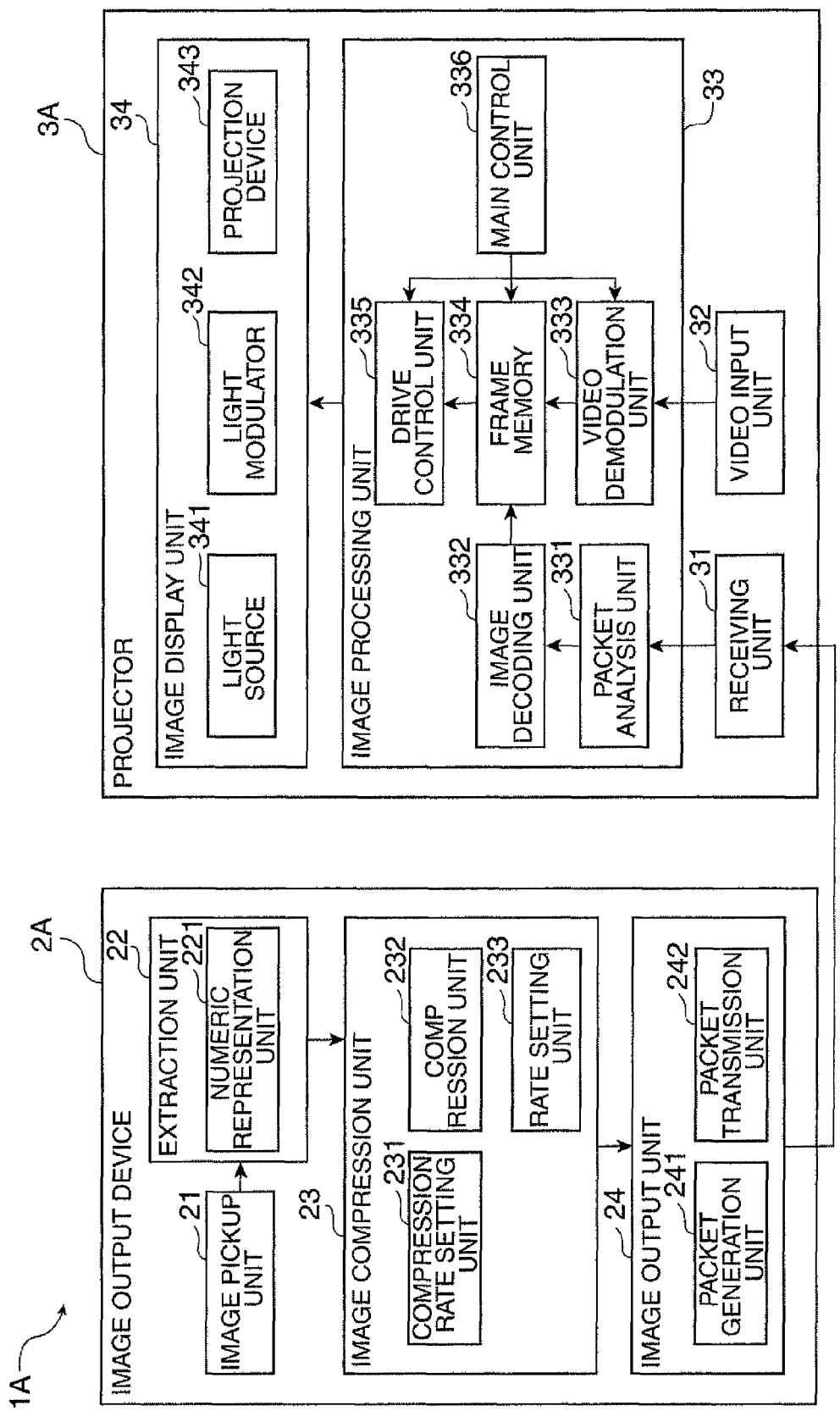
FIG. 1 is a block diagram showing the configuration of a display system according to a first embodiment of the invention.

FIG. 1 is a block diagram showing the configuration of a display system 1A according to this embodiment.

The display system 1A includes an image output device 2A having the functions of an image pickup device, an image data output device and a control device according to the embodiment of the invention, and a projector 3A as an image display device, as shown in FIG. 1. An image corresponding to image data outputted from the image output device 2A is formed and projected on a projection surface of a screen or the like, not shown, by the projector 3A. In this display system 1A, as an edge component of a picked-up image picked up by the image output device 2A is extracted, it is determined whether the picked-up image is a natural image or a non-natural image. A compression rate for the picked-up image is set in accordance with the type and a frame rate at the time of outputting a compressed image is set. The image output device 2A carries out image output corresponding to the set information.

Configuration of Projector

First, the configuration of the projector 3A will be described.

The projector 3A receives a packet including an image data (compressed image data) from the image output device 2A and projects the image on the projection surface, as described above. This projector 3A has a receiving unit 31, a video input unit 32, an image processing unit 33, and an image display unit 34.

The receiving unit 31 receives a packet from the image output device 2A and outputs the packet to the image processing unit 33. The receiving unit 31 and the image output device 2A can be connected to each other by USB connection or by wired or wireless LAN connection.

The video input unit 32 is connected to another image output device (not shown) such as a DVD (digital versatile disc) player and outputs an inputted image signal to the image processing unit 33. The video input unit 32 can be a video terminal (composite video terminal or component video terminal), a D-sub (D-subminiature) terminal, a DVI (digital visual interface) terminal or the like.

On the basis of a driving signal inputted from the image processing unit 33, the image display unit 34 forms and projects an image corresponding to the driving signal. The image display unit 34 has a light source 341, a light modulator 342 which modulates light emitted from the light source 341 and thus forms image light, and a projection device 343 which projects the image light.

Of these, the light modulator 342 has a liquid crystal panel including a pair of transparent glass boards and liquid crystal as an electro-optic material sealed between them, and a driver which drives the liquid crystal panel. In the liquid crystal panel, the orientation of liquid crystal is controlled in accordance with the driving signal and the direction of polarization of an incident luminous flux is modulated. Although the light modulator 342 has a liquid crystal panel in this embodiment, other configurations than a liquid crystal panel such as a device using a micro mirror may be provided.

The image processing unit 33 generates image data equivalent to one screen on the basis of the packet acquired by the receiving unit 31 and the image signal acquired by the video input unit 32, and outputs a driving signal corresponding to the image data to the image display unit 34. The image processing unit 33 has a packet analysis unit 331, an image decoding unit 332, a video demodulation unit 333, a frame memory 334, a drive control unit 335, and a main control unit 336.

Of these, the frame memory 334 is configured to be capable of storing image data corresponding to a display image equivalent to one screen formed by the light modulator 342. To and from this frame memory 334, data is written by the image decoding unit 332 and the video demodulation unit 333 and data is read out by the drive control unit 335.

The packet analysis unit 331 extracts a header part and a data part of the packet received by the receiving unit 31, then reconstructs data included in the data part on the basis of header information included in the header part, and thus generates image data.

The image decoding unit 332 decodes the image data generated by the packet analysis unit 331 and generates image data equivalent to one screen on the frame memory 334.

The video demodulation unit 333 demodulates the image signal acquired by the video input unit 32 and generates image data equivalent to one screen on the frame memory 334.

The drive control unit 335 outputs a driving signal corresponding to the image data generated on the frame memory 334 to the light modulator 342.

The main control unit 336 controls the operation of the entire image processing unit 33. For example, the main control unit 336 designates an address on the frame memory 334 where image data should be written, to the image decoding unit 332 and the video demodulation unit 333. The main control unit 336 also designates an address on the frame memory 334 where image data should be read, to the drive control unit 335. The main control unit 336 also controls lighting of the light source 341 (light on-off control, luminance control and so on).

In this manner, image data corresponding to a packet received by the receiving unit 31 is generated on the frame memory 334 via the packet analysis unit 331 and the image decoding unit 332. Similarly, image data corresponding to an image signal inputted by the video input unit 32 is generated on the frame memory 334 via the video demodulation unit 333. Then, as the drive control unit 335 outputs a driving signal corresponding to the image data to the image display unit 34, an image corresponding to the driving signal, that is, an image corresponding to the packet and image signal, is displayed on the projection surface.

Configuration of Image Output Device

The image output device 2A outputs the image data picked up by an image pickup unit to the projector 3A. In this case, the image output device 2A determines whether the picked-up image is a natural image or non-natural image and outputs the image data compressed in accordance with the image type to the projector 3A at a frame rate corresponding to the image type, as will be described in detail later.

This image output device 2A has an image pickup unit 21, an extraction unit 22, an image compression unit 23, and an image output unit 24. Of these, the image pickup unit 21 constitutes the image pickup device and the image pickup unit according to the embodiment of the invention. The extraction unit 22 and the image compression unit 23 constitute the control device according to the embodiment of the invention.

The image pickup unit 21 acquires a picked-up image that is picked up from a predetermined area. In this embodiment, the image pickup unit 21 includes a 3CCD (charge coupled device) camera. The acquired picked-up image is outputted to the extraction unit 22. The image pickup unit 21 may be a single-color CCD camera which acquires gray scale or may be a camera using a CMOS (complementary metal oxide semiconductor). If the single-color CCD camera is used, the luminance value of each pixel of the picked-up image by the extraction unit 22, which will be described, can easily be acquired.

The extraction unit 22 is equivalent to the extraction unit according to the embodiment of the invention. The extraction unit 22 extracts an edge component of a picked-up image. The extraction unit 22 has a numeric representation unit 221 which numerically represents the edge component on the basis of the luminance value of each pixel forming the picked-up image.

The numeric representation unit 221 performs eight-direction Laplacian filter processing of the luminance component of each pixel forming a picked-up image by using the coefficients shown in the following formula (1) and thus numerically represents the edge component of the picked-up image. In this case, the numeric representation unit 221 gives the numeric representation of the edge component in absolute value. In this Laplacian filter processing, the luminance value of a target pixel is multiplied by the coefficient "−4" at the center. The luminance values of pixels next to the target pixel are multiplied by the corresponding coefficients. Thus, the luminance value of each pixel is calculated. Then, the calculated luminance values of the pixels are summed and the resulting luminance value expressed in absolute value is used as the luminance value of the target pixel.

$$\begin{bmatrix} 0 & 1 & 0 \\ 1 & -4 & 1 \\ 0 & 1 & 0 \end{bmatrix} \quad (1)$$

The image compression unit 23 forms the control device according the embodiment of the invention. The image compression unit 23 determines whether the picked-up image is a natural image or non-natural image, on the basis of the edge component numerically represented by the numeric representation unit 221. The image compression unit 23 compresses the picked-up image at a compression rate corresponding to the type of the picked-up image and sets a frame rate R for transmitting the compressed image. The image compression unit 23 has a compression rate setting unit 231, a compression unit 232, and a rate setting unit 233.

The compression rate setting unit 231 calculates a luminance value L that is the sum of the luminance values of the entire picked-up image having the numerically represented edge component and determines whether the luminance value L is equal to or smaller than a predetermined luminance value L1 or not. Thus, compression rate setting unit 231 sets a compression rate (compression format) for the picked-up image. The luminance values L1, L2 and L3 described below are in the relation of L1<L2<L3 and the luminance value L1 is the smallest.

For example, if the luminance value L is equal to or smaller than the luminance value L1, the compression rate setting unit 231 determines that the picked-up image is a non-natural image and sets the compression format for the picked-up image to a YUV 422 format. With this compression format, the compression rate is lower than in the following case where a low-compression rate JPEG (Joint Photographic Experts Group) format is set.

If the luminance value L is larger than the luminance value L1, the compression rate setting unit 231 determines that the picked-up image is a natural image. The compression rate setting unit 231 further determines whether the luminance value L is equal to or smaller than the luminance value L2 or not, and then determines whether the luminance value L is equal to or smaller than the luminance value L3 or not. The compression rate setting unit 231 sets a compression rate based on the result of the determination.

Specifically, if the luminance value L is equal to or smaller than the luminance value L2, the compression rate setting unit 231 sets a low-compression rate JPEG format as the compression format for the picked-up image. If the luminance value L is larger than the luminance value L2 and equal to or smaller than the luminance value L3, the compression rate setting unit 231 sets an intermediate-compression rate JPEG format. If the luminance value L is larger than the luminance value L3, the compression rate setting unit 231 sets a high-compression rate JPEG format.

The compression unit 232 forms the image output unit according to the embodiment of the invention. The compression unit 232 compresses the picked-up image with the compression format and the compression rate set by the compression rate setting unit 231.

The rate setting unit 233 sets the frame rate R in accordance with the type of the picked-up image to one of rates R1 to R4. The rates R1 to R4 are in the relation of R1<R2<R3<R4 and the speed represented by the rate R4 is the highest.

Specifically, if the luminance value L calculated by the compression rate setting unit 231 is equal to or smaller than the luminance value L1 (if it is determined that the picked-up image is a non-natural image, and the YUV 422 is set), the rate setting unit 233 sets the frame rate R to the lowest rate R1.

If the luminance value L is larger than the luminance value L1 and equal to or smaller than the luminance value L2 (if it is determined that the picked-up image is a natural image, and the low-compression rate JPEG format is set), the rate setting unit 233 sets the frame rate R to the rate R2.

If the luminance value L is larger than the luminance value L2 and equal to or smaller than the luminance value L3 (if it is determined that the picked-up image is a natural image, and the intermediate-compression rate JPEG format is set), the rate setting unit 233 sets the frame rate R to the rate R3.

If the luminance value L is larger than the luminance value L3 (if it is determined that the picked-up image is a natural image, and the high-compression rate JPEG format is set), the rate setting unit 233 sets the frame rate R to the highest rate R4.

The image output unit 24 forms the image output unit according to the embodiment of the invention. The image output unit 24 outputs the compressed image that is compressed by the compression unit 232 to the projector 3A at the frame rate R. This image output unit 24 has a packet generation unit 241 and a packet transmission unit 242.

The packet generation unit 241 generates a packet including the compressed image data and corresponding to the connection format between the image output device 2A and the projector 3A.

The packet transmission unit 242 transmits the generated packet to the projector 3A at the frame rate R.

As the packet transmitted by the packet transmission unit 242 is processed by the projector 3A, an image corresponding to the packet (compressed picked-up image) is displayed by the projector 3A.

Image Output Processing

Figure 2:
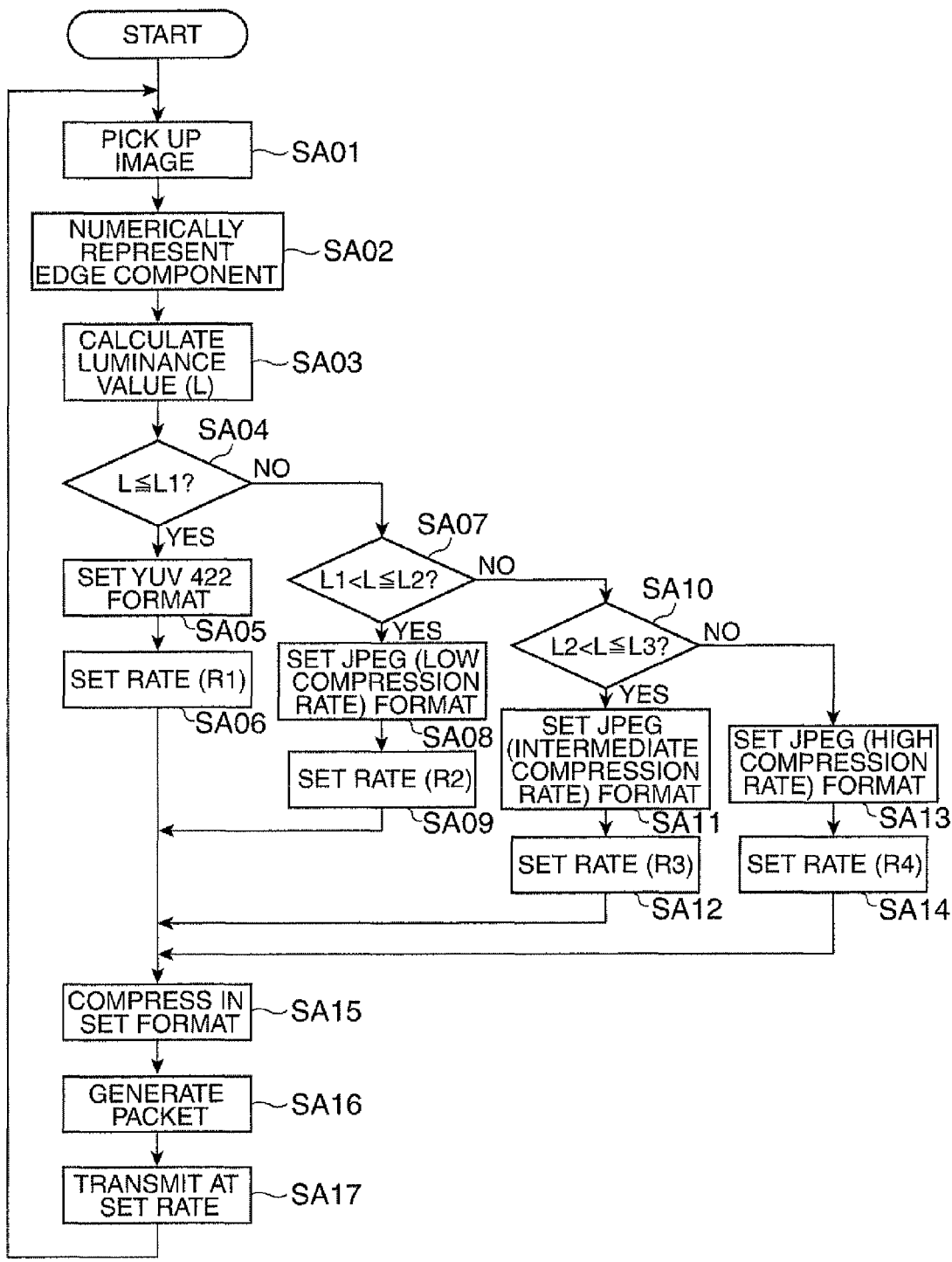
FIG. 2 is a flowchart showing processing by an image output device in the embodiment.

FIG. 2 is a flowchart showing image output processing by the image output device 2A.

The image output device 2A executes image output processing including the following steps SA01 to SA17 by the units 21 to 24 and thus outputs a compressed image acquired by compressing, at the set compression rate, the picked-up image from the image pickup unit 21, at the set frame rate R.

Specifically, in the image output processing, first, the image pickup unit 21 picks up an image of a predetermined area (step SA01), as shown in FIG. 2.

Next, the numeric representation unit 221 executes Laplacian filter processing of the luminance value of each pixel constituting the picked-up image by using the above formula (1) and numerically represents the edge component of the picked-up image (step SA02).

After that, the compression rate setting unit 231 of the image compression unit 23 calculates the luminance value L based on the numerically represented edge component (step SA03).

The compression rate setting unit 231 then determines whether the luminance value L is equal to or smaller than the luminance value L1 or not (step SA04).

Here, if it is determined that the luminance value L is equal to or smaller than the luminance value L1, the compression rate setting unit 231 set the compression format for the picked-up image to the low-compression rate YUV 422 format (step SA05). The rate setting unit 233 sets the frame rate R to the rate R1 (step SA06). After that, the image output device 2A shifts processing to step SA15.

If it is determined in the determination in step SA04 that the luminance value L is larger than the luminance value L1, the compression rate setting unit 231 determines whether the luminance value L is equal to or smaller than the luminance value L2 or not (step SA07).

Here, if it is determined that the luminance value L is equal to or smaller than the luminance value L2, the compression rate setting unit 231 sets the compression format for the picked-up image to the low-compression rate JPEG format (step SA08). The rate setting unit 233 sets the frame rate R to the rate R2 (step SA09). After that, the image output device 2A shifts processing to step SA15.

If it is determined in the determination in step SA07 that the luminance value L is larger than the luminance value L2, the compression rate setting unit 231 determines whether the luminance value L is equal to or smaller than the luminance value L3 or not (step SA10).

Here, if it is determined that the luminance value L is equal to or smaller than the luminance value L3, the compression rate setting unit 231 sets the compression format for the picked-up image to the intermediate-compression rate JPEG format (step SA11). The rate setting unit 233 sets the frame rate R to the rate R3 (step SA12). After that, the image output device 2A shifts processing to step SA15.

If it is determined in the determination in step SA10 that the luminance value L is larger than the luminance value L3, the compression rate setting unit 231 sets the compression format for the picked-up image to the high-compression rate JPEG format (step SA13). The rate setting unit 233 sets the frame rate R to the rate R4 (step SA14). After that, the image output device 2A shifts processing to step SA15.

In step SA15, the compression unit 232 compresses the picked-up image acquired in step SA01 at the compression rate (compression format) set by the compression rate setting unit 231 (step SA15).

After that, the packet generation unit 241 of the image output unit 24 generates a packet corresponding to the connection format between the image output device 2A and the projector 3A from the compressed picked-up image (compressed image) (step SA16). The packet transmission unit 242 then transmits the generated packet to the projector 3A at the set frame rate R (step SA17).

In the projector 3A, where the receiving unit 31 receives such a packet, the packet is processed by the image processing unit 33. Thus, the image corresponding to the packet, that is, the compressed image that is picked up by the image pickup unit 21 and compressed by the image compression unit 23, is displayed on the projection surface by the image display unit 34.

The above-described display system 1A according this embodiment has the following advantages.

(1) A compressed image that is compressed on the basis of an edge component of an acquired picked-up image is outputted from the image output device 2A to the projector 3A. Therefore, the user does not need to carry out an operation such as switching modes between when picking up and outputting a natural image and when picking up and outputting a non-natural image. Moreover, the display system 1A needs no storage unit that compares a picked-up image with a picked-up image that is acquired immediately before the former picked-up image. Thus, the entire display system 1A that can adjust the data size of an image outputted to the projector 3A in accordance with the type of a picked-up image can be inexpensively configured and image output corresponding to the image type can be carried out.

(2) As the extraction unit 22 extracts the edge component from the luminance component of each pixel constituting a picked-up image, the data size of the picked-up image outputted to the projector 3A can be adjusted in accordance with the type of the picked-up image. Therefore, the picked-up image with the adjusted data size can be displayed in real time while deterioration in image quality can be made unnoticeable.

(3) If it is determined that a picked-up image is a natural image, a high-compression rate compression format is set, compared to the case where it is determined that a picked-up image is a non-natural image. Therefore, the data size of the compressed image can be significantly reduced while deterioration in image quality can be made unnoticeable. Meanwhile, if it is determined that a picked-up image is a non-natural image, a compression format with a low compression rate is set. Therefore, a sharp non-natural image without having its edge omitted can be displayed though the data size reduction rate is lower than in the case of a natural image. Thus, the data size of the compressed image to be outputted can be reduced while deterioration in image quality can be made unnoticeable in accordance with the type.

(4) As the numeric representation unit 221 carries out the above filtering of the luminance component of each pixel, the edge component of a picked-up image can be easily numerically represented. Then, as the compression rate setting unit 231 compares the luminance value of the entire picked-up image based on the numerically represented edge component with the predetermined luminance value L1, it can be easily determined whether the picked-up image is a natural image or non-natural image. Thus, the image type can be easily determined.

(5) If it is determined that a picked-up image is a natural image, the rate setting unit 233 sets the frame rate R to the rates R2 to R4, which are high speeds. If it is determined that the picked-up image is a non-natural image, the rate setting unit 233 sets the frame rate R to the rate R1, which is a low speed. Accordingly, a compressed image of a non-natural image having a large data size can be outputted at a low frame rate, and a compressed image of a natural image having a small data size can be outputted at a high frame rate. Thus, the bandwidth of the connection format for connecting the image output device 2A and the projector 3A can be effectively utilized. For example, natural images such as dynamic images and non-natural images such as still images can be properly displayed.

2. Second Embodiment

Next, a display system 1B according to a second embodiment of the invention will be described.

The display system 1B according to this embodiment has an image output device and a projector, similarly to the display system 1A. However, the display system 1B and the display system 1A are different in the following feature. That is, in the display system 1A, the luminance value L is calculated from an edge component of a picked-up image and a compression rate corresponding to the luminance value L is set, whereas in the display system 1B, a vertical and horizontal component from the edge component is highlighted and then binarized and a compression rate is set in accordance with the number of pixels having high luminance. In the following description, the same parts or substantially the same parts as already described parts are noted by the same reference numerals and will not be described further in detail.

Configuration of Display System

Figure 3:
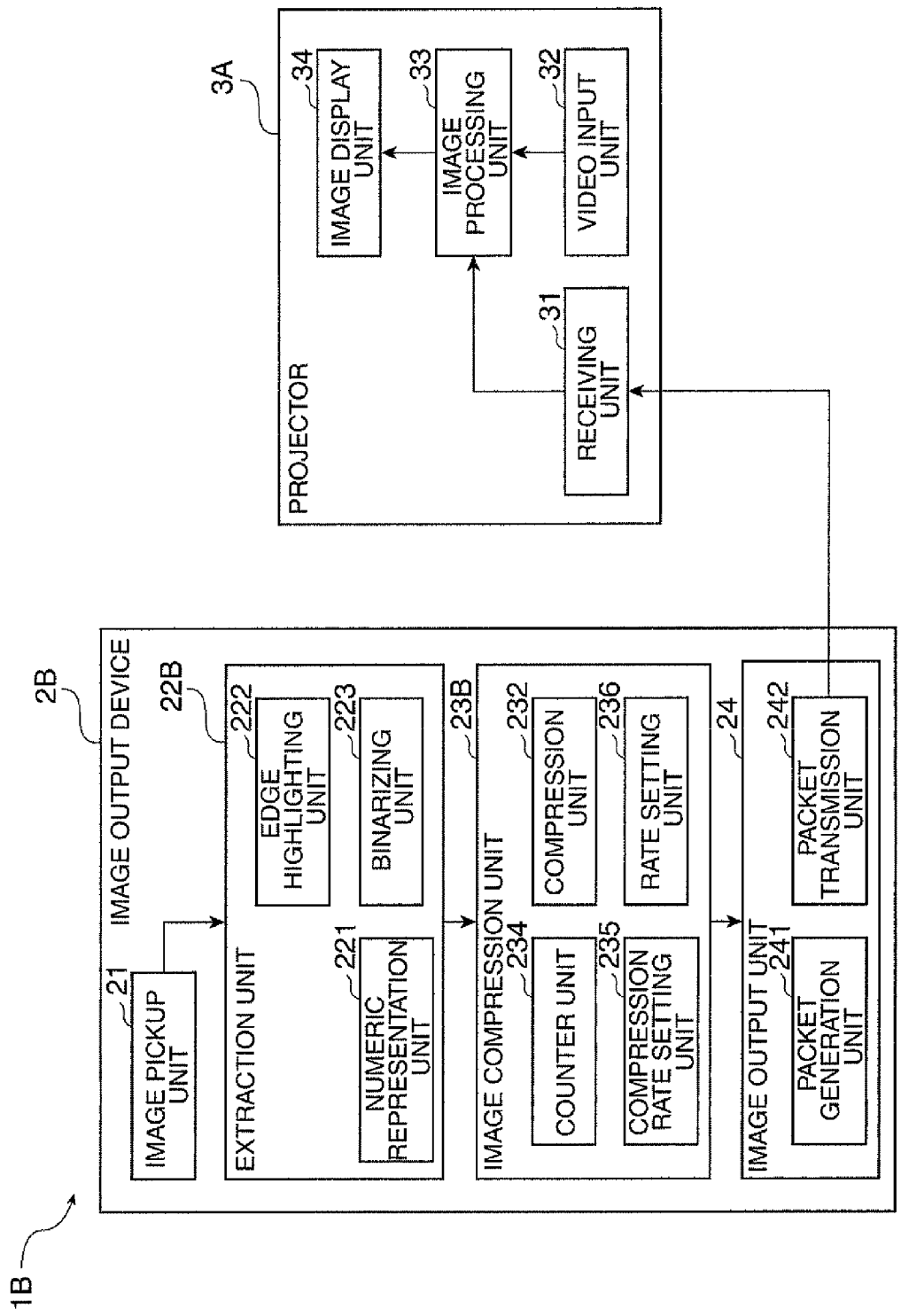
FIG. 3 is a block diagram showing the configuration of a display system according to a second embodiment of the invention.

FIG. 3 is a block diagram showing the configuration of the display system 1B.

The display system 1B includes an image output device 2B having the functions of an image pickup device, an image output device and a control device according to the embodiment of the invention, and a projector 3A as an image display device, as shown in FIG. 3. In the display system 1B, as in the display system 1A, a compressed image that is compressed at a compression rate set in accordance with the type of the picked-up image from an image pickup unit 21 of the image output device 2B is displayed.

Configuration of Image Output Device

The image output device 2B has an image pickup unit 21, an extraction unit 22B, an image compression unit 23B, and an image output unit 24. Of these, the image pickup unit 21 constitutes the image pickup device according to the embodiment of the invention. The extraction unit 22B and the image compression unit 23B constitute the control device according to the embodiment of the invention.

The extraction unit 22B is equivalent to the extraction unit according to the embodiment of the invention. The extraction unit 22B acquires the picked-up image picked up by the image pickup unit 21 and extracts an edge component of the picked-up image. The extraction unit 22B has a numeric representation unit 221, an edge highlighting unit 222, and a binarizing unit 223.

The edge highlighting unit 222 performs filter processing of the edge component numerically represented by the numeric representation unit 221, by using the coefficients shown in the following formula (2). The edge highlighting unit 222 also converts each luminance value acquired by the result of the processing to an absolute value. Vertical and horizontal lines of the picked-up image are highlighted by this edge highlighting unit 222.

$$\begin{bmatrix} -1.25 & 1 & -1.25 \\ 1 & 1 & 1 \\ -1.25 & 1 & -1.25 \end{bmatrix} \quad (2)$$

The binarizing unit 223 binarizes each luminance value converted to an absolute value by the edge highlighting unit 222, by using a predetermined threshold value (for example, a luminance value of 50%). By this binarizing unit 223, the luminance value of a pixel having a luminance value equal to or smaller than 50% is binarized to 0%, and the luminance value of a pixel having a luminance value larger than 50% is binarized to 100%.

The image compression unit 23B sets a compression rate and a frame rate R on the basis of the result of the extraction by the extraction unit 22B and compresses the picked-up image in accordance with the compression rate. The image compression unit 23B includes a counter unit 234, a compression rate setting unit 235, a compression unit 232, and a rate setting unit 236.

Of these, the counter unit 234 counts the number of pixels that have their luminance value set to 100% by the binarizing unit 223 and calculates the proportion Th of the counted number of pixels with respect to the total number of pixels constituting the picked-up image.

The compression unit 232 compresses the picked-up image at a compression rate set by the compression rate setting unit 235.

The compression rate setting unit 235 and the rate setting unit 236 set the compression rate (compression format) for the picked-up image and the frame rate R, respectively, in accordance with the proportion Th calculated by the counter unit 234.

Specifically, the compression rate setting unit 235 and the rate setting unit 236 determine whether the proportion Th is equal to or lower than a predetermined proportion Th1 (for example, 10%) or not. Then, if it is determined that the proportion Th is equal to or lower than the proportion Th1, the compression rate setting unit 235 and the rate setting unit 236 determine that the picked-up image is a natural image. In this case, the compression rate setting unit 235 sets the compression format to the high-compression rate JPEG format. The rate setting unit 236 sets the frame rate R to the rate R4, which is a high speed.

Meanwhile, if it is determined that the proportion Th is higher than the predetermined proportion Th1, the compression rate setting unit 235 and the rate setting unit 236 determine that the picked-up image is a non-natural image. In this case, the compression rate setting unit 235 sets the compression format to the YUV 422 format with a low compression rate. The rate setting unit 236 sets the frame rate R to the rate R1, which is a low speed.

In this embodiment, if the proportion Th is equal to or lower than the proportion Th1, the high-compression rate JPEG format is used as the compression format and the frame rate R is set to the rate R. However, as in the display system 1A, the compression rate and the frame rate may be set specifically in accordance with the proportion of the number of pixels in question.

Image Output Processing

Figure 4:
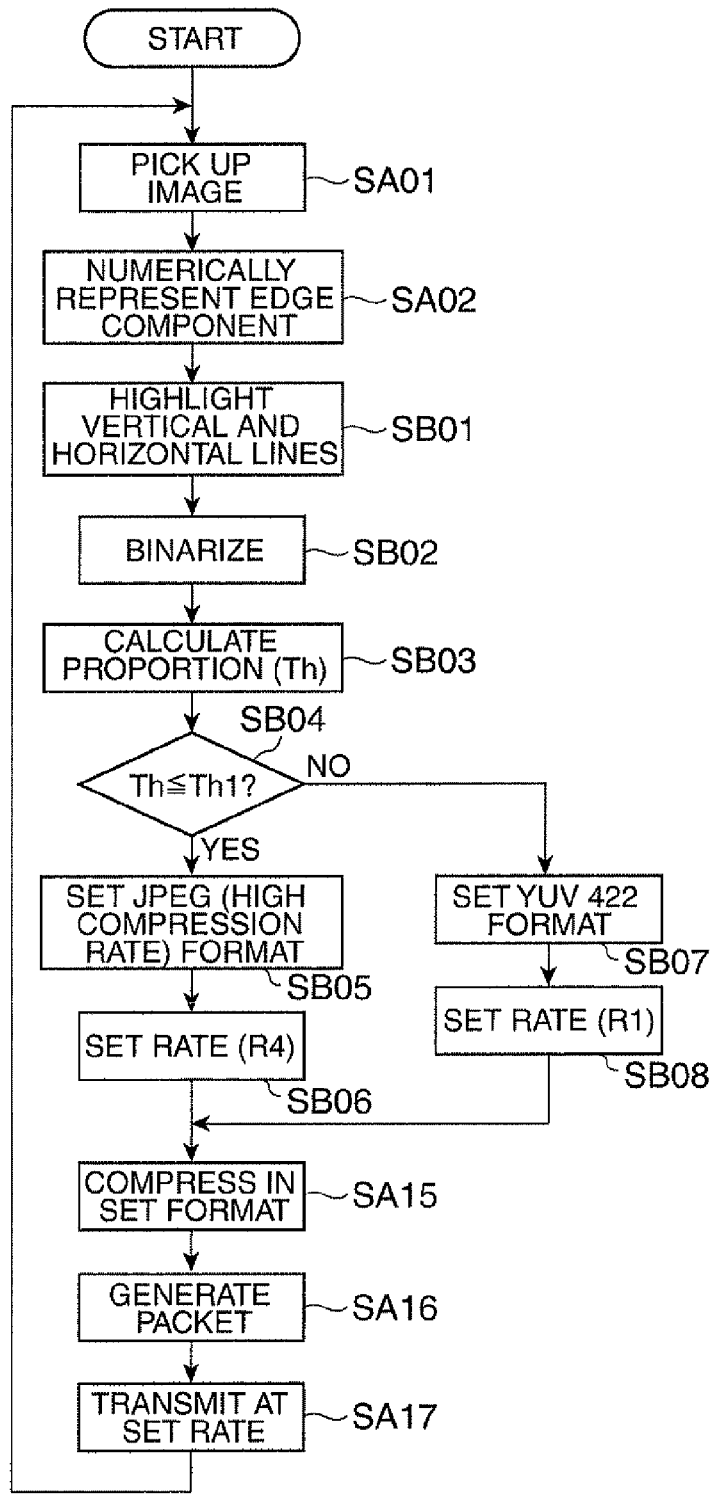
FIG. 4 is a flowchart showing processing by an image output device in the embodiment.

FIG. 4 is a flowchart showing image output processing by the image output device 2B.

The image output device 2B executes image output processing including the following steps SAS01, SA02, SB01 to SB08 and SA15 to SA17 by the units 21, 228, 23B and 24 and thus transmits a compressed image that is compressed at the set compression rate, at the set frame rate R.

Specifically, in the image output processing, first, the image pickup unit 21 acquires a picked-up image picked up from a predetermined area (step SA01), and the numeric representation unit 221 numerically represents the edge component of the picked-up image (step SA02), as shown in FIG. 4. Then, the edge highlighting unit 222 executes the above filter processing to highlight vertical and horizontal lines (step SB01). The binarizing unit 223 carries out binarization (step SB02).

Next, the counter unit 234 calculates the proportion Th of the number of pixels having a luminance value of 100% with respect to the total number of pixels (step SB03). The compression rate setting unit 235 and the rate setting unit 236 determine whether the proportion Th is equal to or lower than a predetermined proportion Th1 or not (step S804). If it is determined that the proportion Th is equal to or lower than the predetermined proportion Th1, the compression rate setting unit 235 and the rate setting unit 236 determine that the picked-up image is a natural image. The compression rate setting unit 235 sets the compression format to the high-compression rate JPEG format (step SB05). The rate setting unit 236 sets the frame rate R to the rate R4 (step SB06). After that, the image output device 2B shifts processing to step SA15.

If it is determined in the determination in step SB04 that the proportion Th is higher than the proportion Th1, the compression rate setting unit 235 and the rate setting unit 236 determine that the picked-up image is a non-natural image. The compression rate setting unit 235 sets the compression format to the YUV 422 format (step SB07). The rate setting unit 236 sets the frame rate R to the rate R1 (step SB08). After that, the image output device 2B shifts processing to step SA15.

In step SA15, the compression unit 232 compresses the picked-up image with the set compression format (compression rate) and thus generates a compressed image (step SA15), as described above. The packet generation unit 241 then generates a packet from the compressed image (step SA16). The packet transmission unit 242 transmits the packet to the projector 3A at the set frame rate R (step SA17).

As such image output processing is repeatedly executed, compressed images acquired by compressing picked-up images are displayed by the projector 3A.

The above-described display system 1B according to this embodiment has the following advantages as well as the advantages similar to (1) to (5) of the display system 1A.

(6) In filter processing by the edge highlighting unit 222, an edge component having highlighted vertical and horizontal lines of an image is extracted. Moreover, the edge component is further highlighted in binarization by the binarizing unit 223. Accordingly, the type of the picked-up image can be determined more properly on the basis of the number of binarized pixels. Thus, the compression rate for the picked-up image and the frame rate R can be set more properly.

3. Third Embodiment

Next, a display system 10 according to a third embodiment of the invention will be described.

The display system 10 according to this embodiment has an image output device and a projector, similarly to the display systems 1A and 1B. However, the display system 1C is different from the display systems 1A and 1B in that, in the display systems 1A and 1B, the image output devices 2A and 2B have the compression rate setting unit 231 and the rate setting unit 233, whereas in the display system 10, the projector has these units.

Configuration of Display System

Figure 5:
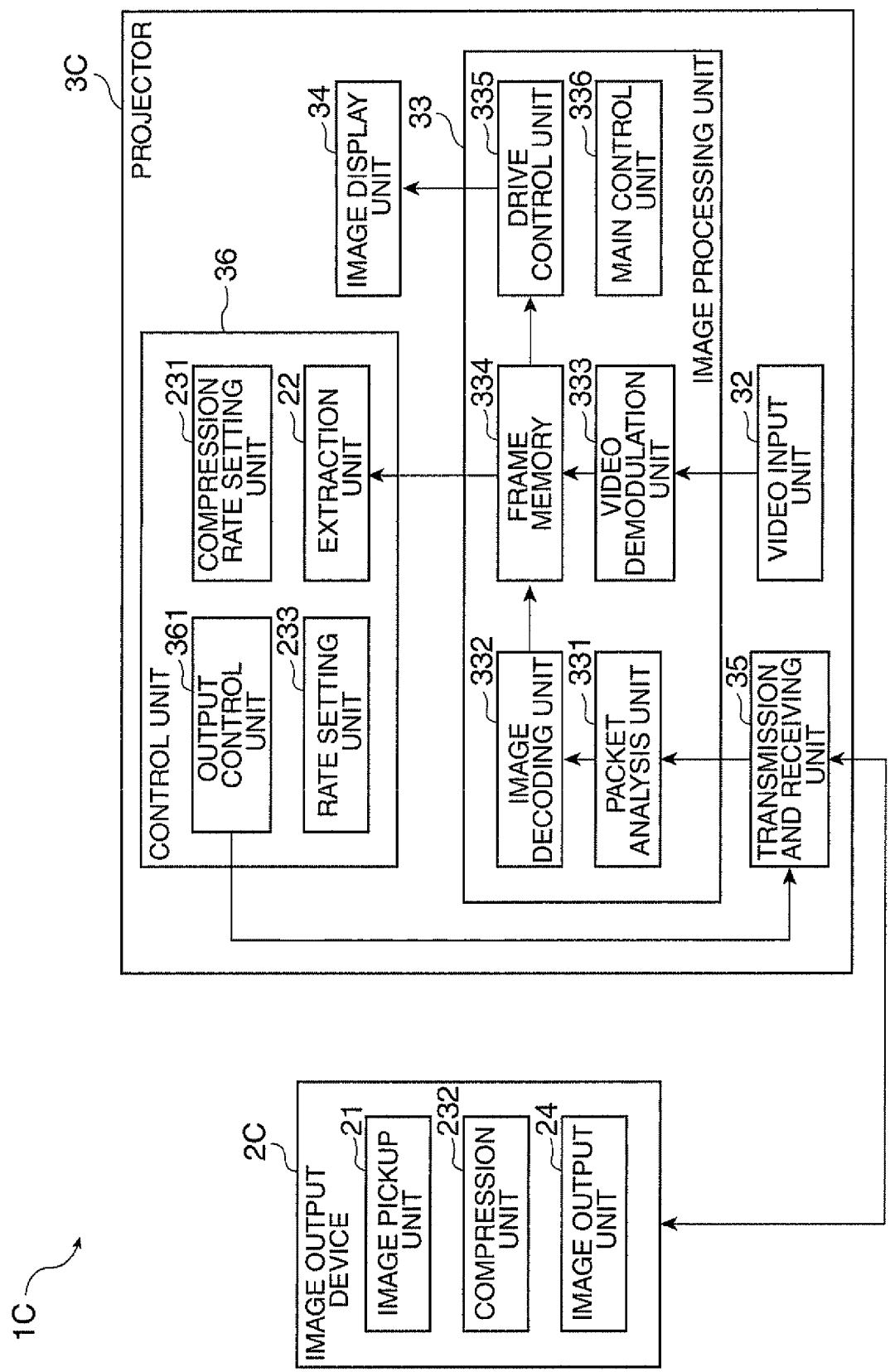
FIG. 5 is a block diagram showing the configuration of a display system according to a third embodiment of the invention.

FIG. 5 is a block diagram showing the configuration of the display system 1C.

The display system 1C includes an image output device 20 having the functions of an image pickup device and an image output device according to the embodiment of the invention, and a projector 3C having the functions of a control device and an image display device according to the embodiment of the invention, as shown in FIG. 5. The image output device 2C compresses and outputs a picked-up image on the basis of a compression rate and a frame rate R set by the projector 3C. The projector 3C displays the compressed picked-up image.

Configuration of Image Output Device

The image output device 2C has an image pickup unit 21, a compression unit 232, and an image output unit 24. Of these, the compression unit 232 compresses picked-up image picked up by the image pickup unit 21 in accordance with a compression rate (compression format) included in setting information transmitted from the projector 3C. The image output unit 24 transmits a packet generated from the compressed image to the projector 3C in accordance with a frame rate R included in the setting information.

If the setting information is not transmitted from the projector 3C, the compression unit 232 does not compress the picked-up image. Therefore, a packet generation unit 241 (not shown in FIG. 5) constituting the image output unit 24 generates a packet corresponding to the picked-up image picked up by the image pickup unit 21. A packet transmission unit 242 transmits the packet to the projector 3C.

Configuration of Projector

The projector 3C, similarly to the projector 3A, acquires a compressed image from the image output device 2C and displays the compressed image. The projector 30 also acquires a non-compressed picked-up image from the image output device 2C and transmits setting information for setting a compression rate and a frame rate R to the image output device 2C. This projector 3C has a transmission and receiving unit 35, a video input unit 32, an image processing unit 33, an image display unit 34, and a control unit 36.

Of these, the transmission and receiving unit 35 receives a picked-up image and a compressed image transmitted from the image output device 20 and also transmits setting information set by the control unit 36, which will be described later, to the image output device 2C.

The control unit 36 constitutes the control device and the control unit according to the embodiment of the invention. The control unit 36 extracts an edge component of a picked-up image transmitted from the image output device 2C and sets a compression rate and a frame rate R based on the edge component. The control unit 36 then transmits setting information including the compression rate and the frame rate R to the image output device 2C via the transmission and receiving unit 35. The control unit 36 has an extraction unit 22, a compression rate setting unit 231, a rate setting unit 233, and an output control unit 361.

Of these, the extraction unit 22 acquires a non-compressed picked-up image transmitted from the image output device 2C, from the frame memory 334 of the image processing unit 33, and extracts the edge component of the picked-up image. Specifically, a numeric representation unit 221 (not shown in FIG. 5) of the extraction unit 22 executes Laplacian filter processing of the picked-up image using the coefficients shown in the formula (1) and numerically represents the edge component of the picked-up image.

The compression rate setting unit 231 and the rate setting unit 233 sets a compression rate and a frame rate R on the basis of the edge component that is numerically represented by the extraction unit 22, as described above.

The output control unit 361 transmits setting information including the set compression rate and frame rate R to the image output device 2C via the transmission and receiving unit 35. Thus, the compression unit 232 of the image output device 2C compresses the picked-up image acquired by the image pickup unit 21 in accordance with the compression rate included in the setting information. The image output unit 24 transmits a packetized compressed image to the projector 3C in accordance with the frame rate R that is similarly included in the setting information.

Image Display Processing

Figure 6:
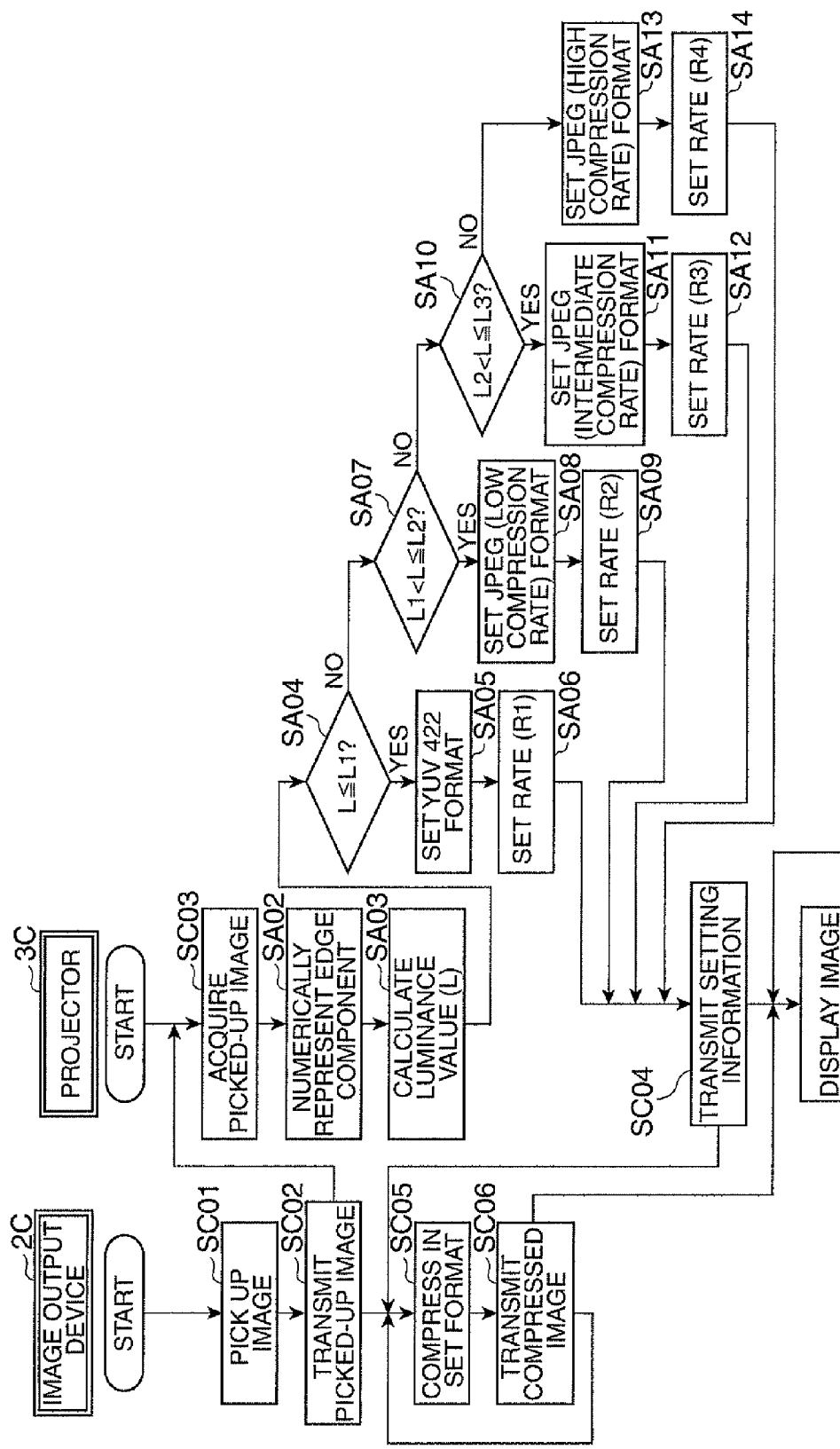
FIG. 6 is a flowchart showing processing by an image output device and a projector in the embodiment.

FIG. 6 is a flowchart showing processing by the image output device 2C and the projector 3C.

The image output device 2C and the projector 3C, in collaboration with each other, carry out compression of a picked-up image and display of a compressed image.

Specifically, as shown in FIG. 6, first, the image pickup unit 21 of the image output device 2C acquires a picked-up image that is picked up from a predetermined area (step SC01). The image output unit 24 transmits a packet including the picked-up image data to the projector 3C (step SCO2).

After that, the transmission and receiving unit 35 of the projector 3C receives the packet and the image processing unit 33 reconstructs the packet to acquire the picked-up image (step SCO3).

Next, the extraction unit 22 numerically represents an edge component from the picked-up image generated on the frame memory 334 (step SA02). The compression rate setting unit 231 then calculates the luminance value L based on the edge component (step SA03). On the basis of this luminance value L, processing similar to the above-described steps SA04 to SA14 is executed and a compression rate and a frame rate R for the picked-up image are set.

After these steps SA04 to SA14, the output control unit 361 transmits setting information including the compression rate and the frame rate to the image output device 2C via the transmission and receiving unit 35 (step SC04).

In the image output device 2C, to which the setting information is transmitted, the compression unit 232 compresses the picked-up image in accordance with the set compression rate (compression format) (step SC05). The image output unit 24 then generates a packet from the compressed picked-up image (compressed image) and transmits the packet to the projector 3C (step SC06).

After that, as the packet is received by the transmission and receiving unit 35, the image processing unit 33 processes the packet and the image display unit 34 displays the decoded compressed image (step SC07).

In the above-described manner, the picked-up image picked up by the image output device 2C is compressed and transmitted to the projector 3C and is displayed by the projector 3C.

In this embodiment, the control unit 36 has the extraction unit 22, the compression rate setting unit 231 and the rate setting unit 233. However, instead of these units, the control unit 36 may have the above-described extraction unit 22B, the counter unit 234, the compression rate setting unit 235 and the rate setting unit 236.

The above-described display system 1C according to this embodiment can achieve advantages similar to the advantages (1) to (5) of the display system 1A.

4. Fourth Embodiment

Next, a display system 1D according to a fourth embodiment of the invention will be described.

The display system 1D according to this embodiment is different from the display systems 1A to 1C in that, in the display system 1D, an image pickup unit constitutes an image pickup device separately from an image output device and that a control unit constitutes a control device separately from a projector.

Figure 7:
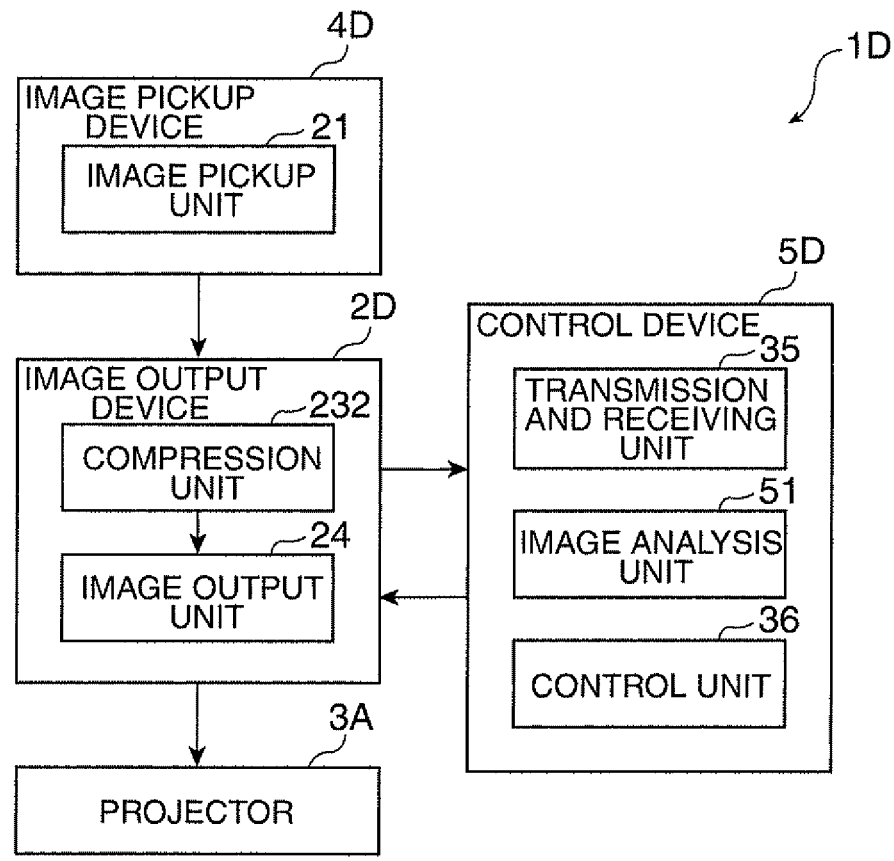
FIG. 7 is a block diagram showing the configuration of a display system according to a fourth embodiment of the invention.

FIG. 7 is a block diagram showing the configuration of the display system 1D.

The display system 1D includes an image pickup device 4D having an image pickup unit 21, an image output device 2D having a compression unit 232 and the image output unit 24, a projector 3A, and a control device 5D, as shown in FIG. 7.

Of these, the compression unit 232 compresses a picked-up image acquired from the image pickup device 4D at a compression rate set by the control device 5D, which will be described later.

If the setting information is not received, the image output unit 24 generates a packet from a non-compressed picked-up image acquired from the image pickup device 4D and transmits the packet to the control device 5D. If the setting information is received, the image output unit 24 transmits the compressed image compressed by the compression unit 232 to the projector 3A at a set frame rate R.

The control device 5D acquires a non-compressed picked-up image from the image output device 2D and sets a compression rate and a frame rate R based on an edge component of the picked-up image. The control device 5D then transmits the setting information including these rates to the image output device 20. The control device 5D has a transmission and receiving unit 35, an image analysis unit 51, and a control unit 36.

Of these, the image analysis unit 51 has a packet analysis unit 331 and a frame memory 334, though not shown. The packet analysis unit 331 reconstructs the packet received from the image output device 2D via the transmission and receiving unit 35 and develops the picked-up image included in the packet, on the frame memory 334.

The control unit 36 has, as described above, an extraction unit 22, a compression rate setting unit 231, a rate setting unit 233, and an output control unit 361, though not shown. The extraction unit 22 extracts an edge component of the picked-up image developed on the frame memory 334. On the basis of the edge component, the compression rate setting unit 231 and the rate setting unit 233 set a compression rate and a frame rate R, respectively. The output control unit 361 transmits setting information including these rates to the image output device 2D via the transmission and receiving unit 35.

In the display system 1D, the image pickup device 4D executes the above step SC01 and the image output device 2D executes the above step SC02. The control device 5D executes the above steps SC03, SA02 to SA14, and SC04. Thus, the compression rate and the frame rate R are set. Moreover, as the image output device 2D executes the above steps SC05 and SC06 and the projector 3A executes the above step SC07, the projector 3A can display a compressed image based on the picked-up image acquired by the image pickup device 4D.

The above-described display system 1D according to this embodiment can achieve advantages similar to the advantages (1) to (5) of the display system 1A.

5. Modifications of Embodiments

The invention is not limited to the foregoing embodiments, and modifications and improvements can be made without departing from the scope of the invention.

In the foregoing embodiments, the projectors 3A and 3C are employed as image display devices. However, the invention is not limited to these. Various kinds of displays including a liquid crystal display, a plasma display, an organic EL (electroluminescence) display and a CRT (cathode ray tube) may be employed as image display devices.

In the second embodiment, on the basis of the number of pixels having a luminance value of 100% that is binarized by the binarizing unit 223, the counter unit 234 calculates the proportion Th of the number of pixels having a luminance value of 100% with respect to the total number of pixels. The proportion Th is then compared with a predetermined proportion Th1. Thus, it is determined whether the picked-up image is a natural image or non-natural image. However, the invention is not limited to this. For example, the sum of binarized luminance values may be compare with a predetermined threshold value.

In the foregoing embodiments, the image output devices 2A to 2D output a compressed image as a result of compressing a picked-up image from the image pickup unit 21 at a set compression rate to the projectors 3A and 3C. However, the invention is not limited to this. For example, a still image or dynamic image stored in a predetermined storage device, or an image inputted from another image output device may also be used.

The invention can be suitably utilized for a display system having an image output device and an image display device.

What is claimed is:

1. A display system comprising:
    an image data output device which outputs image data;
    an image display device which displays an image corresponding to the image data; and
    a control device which controls the image data output device,
    wherein one of the control device and the image data output device has a compression rate setting unit which determines whether the image corresponding to the image data is a natural image or not and sets a compression rate for the image in accordance with a type of the image,
    the image data output device has an image data output unit which outputs a compressed image data acquired by compressing the image data at the compression rate set by the compression rate setting unit, and
    one of the control device and the image data output device further comprises an extraction unit which extracts an edge component of the image data, and the extraction unit has a numeric representation unit which performs predetermined filter processing to a luminance component of each pixel constituting the image data and numerically represents the edge component of the image data.

2. The display system according to claim 1, further comprising an image pickup device which inputs a picked-up image to the image data output device,
    wherein the image data output unit compresses the image inputted from the image pickup device at the compression rate and outputs the compressed image data.

3. The display system according to claim 1, wherein the compression rate setting unit sets a predetermined compression rate if it is determined that the image corresponding to the image data is a natural image, and the compression rate setting unit sets a lower compression rate than the predetermined compression rate if it is determined that the image corresponding to the image data is not a natural image.

4. The display system according to claim 1, wherein the extraction unit comprises:
    an edge highlighting unit which performs processing to highlight an edge in a predetermined direction, with respect to the edge component numerically represented by the numeric representation unit; and
    a binarizing unit which binarizes the edge component highlighted by the edge highlighting unit on the basis of a predetermined threshold value,
    wherein the compression rate setting unit determines that the image corresponding to the image data is a natural image if it is determined that a luminance value of the image processed by the binarizing unit is equal to or smaller than a predetermined luminance value, and the compression rate setting unit determines that the image corresponding to the image data is not a natural image if it is determined that the luminance value of the image is greater than the predetermined luminance value.

5. The display system according to claim 1, wherein one of the control device and the image data output device has a rate setting unit which sets a frame rate at the time of outputting the compressed image data, in accordance with the type of the image corresponding to the image data.

6. An image data output device which outputs image data, comprising:
    an image pickup unit;
    an extraction unit which extracts an edge component of picked-up image data, and the extraction unit has a numeric representation unit which performs predetermined filter processing to a luminance component of each pixel constituting the picked-up image data and numerically represents the edge component of the picked-up image data;
    a compression rate setting unit which determines whether a picked-up image corresponding to the picked-up image data is a natural image or not and sets a compression rate for the picked-up image data in accordance with a type of the picked-up image corresponding to the picked-up image data; and
    an image data output unit which outputs a compressed image data acquired by compressing the picked-up image at the compression rate that is set.

7. An image data transmission method for transmitting image data from an image data output device to an image display device, the method comprising:
    in the image data output device,
    (a) extracting an edge component of the image data;
    (b) performing predetermined filter processing to a luminance component of each pixel constituting the image data and numerically representing the edge component of the image data;
    (c) determining whether an image corresponding to the image data is a natural image or not and setting a compression rate for the image data;
    (d) compressing the image data at the set compression rate; and
    (e) outputting the compressed image data compressed at the compression rate as the image data to the image display device.

8. The image data transmission method according to claim 7, wherein in (c), a predetermined compression rate is set if it is determined that the image corresponding to the image data is a natural image, and a lower compression rate than the predetermined compression rate is set if it is determined that the image corresponding to the image data is not a natural image.

9. The image data transmission method according to claim 7, further comprising, prior to (e),
    (f) setting a frame rate at the time of outputting the compressed image data in accordance with a type of the image.

10. The image data transmission method according to claim 7, further comprising, prior to (c),
    (g) performing processing to highlight an edge in a predetermined direction, with respect to the numerically represented edge component; and
    (h) binarizing the edge component highlighted by the filter processing, on the basis of a predetermined threshold value,
    wherein in (c), it is determined that the image corresponding to the image data is a natural image if it is determined that a luminance value of the image with the binarized edge component is equal to or smaller than a predetermined luminance value, and it is determined that the image corresponding to the image data is not a natural image if it is determined that the luminance value of the image is greater than the predetermined luminance value.

* * * * *